US012771455B2

(12) United States Patent
Huang et al.

(10) Patent No.: US 12,771,455 B2
(45) Date of Patent: Oct. 20, 2026

(54) PHOTONIC SYSTEM WITH MARKER TONE

(71) Applicant: Intel Corporation, Santa Clara, CA (US)

(72) Inventors: Duanni Huang, San Jose, CA (US); Xinru Wu, San Jose, CA (US); Taehwan Kim, Portland, OR (US); Ganesh Balamurugan, Hillsboro, OR (US); Haisheng Rong, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 18/523,592

(22) Filed: Nov. 29, 2023

(65) Prior Publication Data

US 2024/0204879 A1 Jun. 20, 2024

Related U.S. Application Data

(60) Provisional application No. 63/432,583, filed on Dec. 14, 2022.

(51) Int. Cl.
*H04B 10/50* (2013.01)
*H04B 10/69* (2013.01)

(52) U.S. Cl.
CPC ....... *H04B 10/503* (2013.01); *H04B 10/6911* (2013.01)

(58) Field of Classification Search
CPC .......................... H04B 10/503; H04B 10/6911
USPC .......................................................... 398/201
See application file for complete search history.

(56) References Cited

U.S. PATENT DOCUMENTS

| | | | | |
|---|---|---|---|---|
| 9,614,639 B2 * | 4/2017 | Nilsson | H04B 10/0775 | |
| 9,692,521 B1 * | 6/2017 | Zhou | H04B 10/532 | |
| 10,491,307 B2 * | 11/2019 | Matsushita | H04B 10/5053 | |
| 11,581,950 B2 * | 2/2023 | Jafari | H04B 10/541 | |
| 2019/0149240 A1 * | 5/2019 | Moss | G02F 1/0123 438/59 | |
| 2020/0162165 A1 * | 5/2020 | Zhou | H04B 10/505 | |

OTHER PUBLICATIONS

Che et al., "Polarization Demultiplexing for Stokes Vector Direct Detection." Journal of Lightwave Technology, vol. 34, No. 2, Jan. 15, 2016, pp. 754-760.

Doerr et al., "PDM-DQPSK Silicon Receiver With Integrated Monitor and Minimum Number of Controls" IEEE Photonics Technology Letters, vol. 24, No. 8, Apr. 15, 2012, pp. 697-699.

(Continued)

*Primary Examiner* — Dalzid E Singh

(74) *Attorney, Agent, or Firm* — Schwabe, Williamson & Wyatt, P.C.

(57) ABSTRACT

Embodiments herein relate to an optical system coupled with or including a control logic. The control logic may be configured to identify, based on feedback provided by a photodiode (PD) of an optical receiver, that an amplitude of an optical marker signal output by an interferometer of the optical receiver is above a threshold value. The control logic may further be configured to adjust, based on the identification, a thermo-optic phase tuner of the interferometer, wherein adjustment of the thermo-optic phase tuner results in a change to the amplitude of the optical marker signal. Other embodiments may be described and/or claimed.

14 Claims, 8 Drawing Sheets

(56) References Cited

OTHER PUBLICATIONS

Perin et al., “Design of Low-Power DSP-Free Coherent Receivers for Data Center Links”. Journal of Lightwave Technology, vol. 35, No. 21, Nov. 1, 2017, pp. 4650-4662.
Ma et al., “Automated Adaptation and Stabilization of a Tunable WDM Polarization-Independent Receiver on Active Silicon Photonic Platform” IEEE Photonics Journal, vol. 12, No. 4, Aug. 2020, pp. 1-11.

* cited by examiner

PHOTONIC SYSTEM WITH MARKER TONE

CROSS-REFERENCE TO RELATED APPLICATIONS

This application claims priority to U.S. Provisional Patent Application 63/432,583, filed Dec. 14, 2022, the contents of which are incorporated herein in their entirety.

BACKGROUND

The data rate of an intensity-modulated, direct-detection (IM-DD) short-reach optical link may be doubled by transmitting data on both polarizations of light simultaneously through a single fiber. Such a transmission scheme may be referred to as polarization division multiplexing (PDM). PDM may be combined with another type of multiplexing such as wavelength division multiplexing (WDM) to double the data rate of the optical signal being transmitted through the optical fiber. However, random drift in the input polarization state to the receiver due to perturbations such as environmental perturbations may case radio frequency (RF) crosstalk and degrade signal quality as a result.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
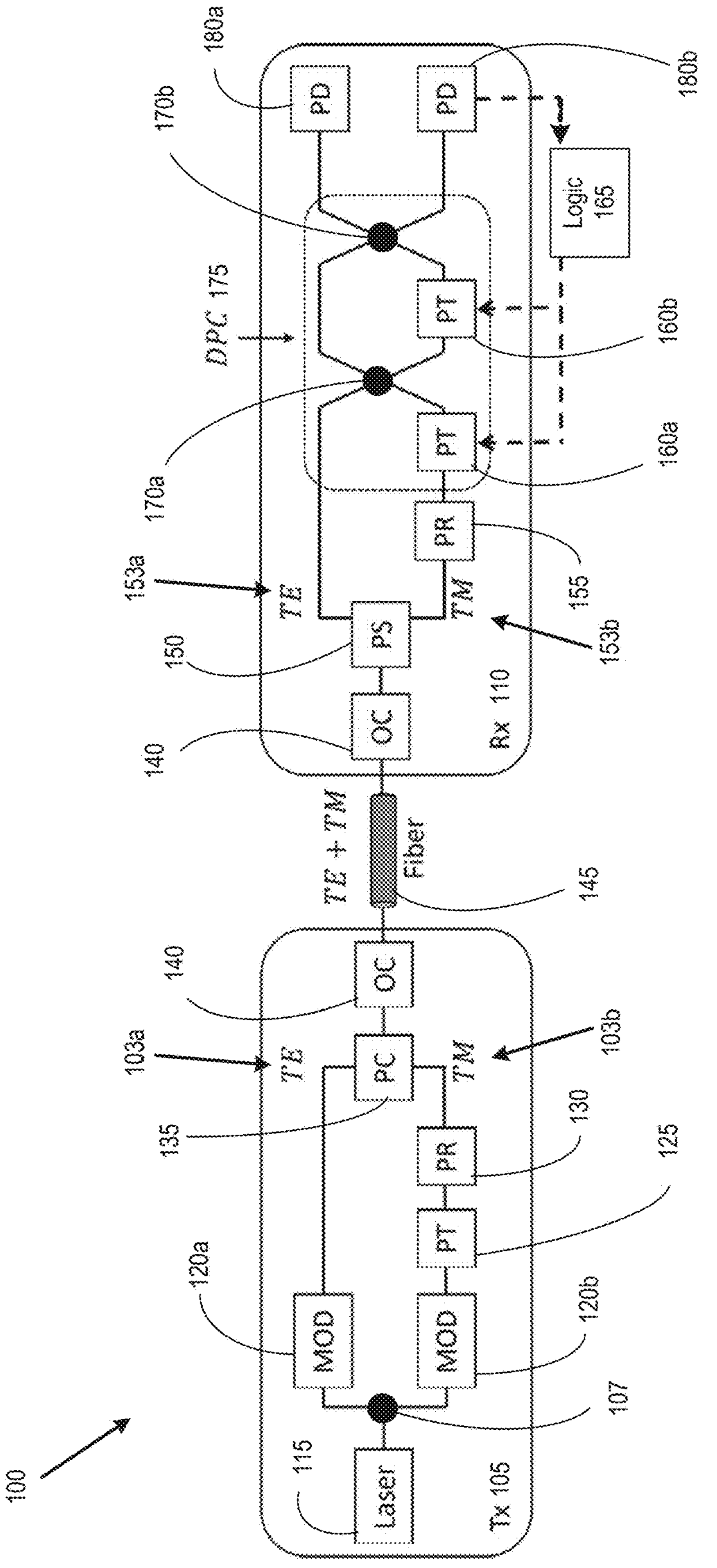
FIG. 1 illustrates an example system-level diagram of an optical system, in accordance with various embodiments.

Embodiments described herein may include apparatus, systems, techniques, or processes that are directed to the above-described issues related to polarization drift of a signal with data included in both polarizations of an optical signal. Specifically, embodiments herein relate to a polarization demultiplexing scheme that may enable tracking and recovery of the original polarization state (e.g., the polarization state that is output by a transmitter of an optical system) in the optical domain. The tracking may be facilitated through the use of a relatively low-speed (as compared to a data rate of the data modulated into the optical signal) marker tone, which may be inserted into the optical signal. For example, in some embodiments, the marker tone may have a frequency on the order of 10 kilohertz (kHz) (e.g., be between approximately 5 kHz and approximately 15 kHz). In other embodiments, the marker tone may be between approximately 10 KHz and approximately 1 megahertz (mHz).

Embodiments may provide a number of advantages. For example, the marker tone may be inserted into the optical signal in a relatively low-power manner and low-latency manner. Additionally, the use of the marker tone may be scalable to a larger WDM channel count without an increased power or latency penalty. This usage may be achieved because, regardless of the number of wavelengths being transmitted or received, only a single marker tone may be required. As a result, the amount of data transmitted by the optical signal may be significantly increased (e.g., on the order of 2× or more), which may be highly beneficial in high-capacity, lower-power optical links that are used for applications such as co-packaged optics or optical input/output (I/O).

At a high level, embodiments may relate to the encoding of high-speed data (e.g., data with a relatively high data rate on the order of 10s of gigabits per second (gb/s), or between approximately 10 gb/s and approximately 300 gb/s) on two orthogonal polarizations of light at an optical transmitter. Additionally, a relatively low-speed marker tone in the phase domain may also be encoded on one of the two polarizations. The strength (i.e., amplitude) of the applied marker tone, as well as higher harmonics of the marker tone frequency, are extracted at the optical receiver. The marker tone amplitude and/or harmonics may be minimized by adjusting the delay and/or mixing of the two polarizations of light at the receiver. Minimizing the marker tone amplitude at the receiver may correlate to an optimal demultiplexing condition for the receiver, and result in a reduced or negated amount of crosstalk between the two data streams. Additionally, if multiple wavelengths of light are used at the transmitter, a common marker tone may be applied and detected for all wavelengths. In some embodiments, such usage may require that the differential delay between the two polarizations of light is zero or close to zero (e.g., less than or equal to approximately 100 femtoseconds (fs)).

FIG. 1 illustrates an example system-level diagram of an optical system 100, in accordance with various embodiments. Specifically, the optical system 100 may include an optical transmitter 105 and an optical receiver 110. The optical transmitter 105 and optical receiver 110 may be joined by an optical fiber 145. In embodiments, the optical fiber 145 may be used in an optical input/output (I/O) application wherein the optical fiber 145 has a length of approximately 10 centimeters to a meter. However, other embodiments may be used in data center optical interconnects where the optical fiber 145 has a length between approximately 100 meters and 1 kilometer (km). Other embodiments may be used in different applications with a longer or shorter optical fiber 145. In some embodiments, all of the elements of the optical transmitter 105 (and/or some other optical transmitter described herein) may be integrated into a single photonic integrated circuit (PIC). Similarly, in some embodiments, all of the elements of the optical receiver 110 (and/or some other optical receiver 110 described herein) may be integrated into a single PIC. In some embodiments, one or both of the optical transmitter 105 and optical receiver 110 may be distributed among a plurality of PICs.

The optical transmitter 105 may include an optical source 115 such as a laser. In some implementations, optical source 115 may be an hybrid laser including a indium phosphide light source physically and optically coupled to a waveguide, such as a silicon waveguide in a PIC. The optical source 115 may be configured to emit an optical signal with a known wavelength or frequency. As may be seen, the optical signal may be output from the optical source 115 and input into a 1:2 optical splitter 107 that splits the optical signal along a first optical pathway 103*a* and a second optical pathway 103*b*. It will be noted that the two optical pathways 103*a*/103*b* are respectively labelled as a transverse electric (TE) and transverse magnetic (TM) pathway. However, in other embodiments, the pathway 103*b* may be the TE pathway and the pathway 103*a* may be the TM pathway. In other words, the various elements shown in the pathway 103*b* may be positioned in pathway 103*a* in other embodiments.

As noted, pathway 103*a* may include a modulator 120*a*. The modulator 120*a* may be configured to receive a first data signal (e.g. from a processor or some other logic of an electronic device of which the optical system 100 is a part) and encode the first data signal into the optical signal received from the splitter 107.

Pathway 103*b* may include a modulator 120*b*, which may be similar to modulator 120*a*. Specifically, modulator 120*b* may be configured to receive a second data signal and encode the second data signal into the optical signal received from the splitter 107. After the second data signal is encoded into the optical signal in the optical pathway 103*b*, the signal may be input to a phase tuner (PT) 125. The PT 125 may be, for example, a ring modulator or some other type of PT. Generally, the PT may be a thermo-optic PT that is configured to further encode a marker tone into the optical signal. As previously noted, the marker tone may be on the order of 10s of kHz, and may have a generally sinusoidal waveform.

The optical pathway 103*b* may further include a polarization rotator (PR) 130. The PR may be configured to rotate the optical signal into an orthogonal polarization (e.g., the TM polarization) from the top arm (which is in the TE polarization). The two orthogonal polarizations of light may then be combined into a single waveguide using a polarization combiner (PC) 135, and input into the optical fiber 145 via an optical coupler (OC) 140 to which the optical fiber 145 is coupled. In some embodiments, the optical fiber 145 may be referred to as a single-mode fiber.

As described above, as the optical signal (which includes both the TE mode output from pathway 103*a* and the TM mode output from pathway 103*b*) traverses through the optical fiber 145, the polarization state of the optical signal may be altered based on factors such as random linear and/or circular birefringence in the optical fiber 145, and/or some other factor. As a result, the optical signal may arrive at the optical receiver 110 with an unknown polarization state. Specifically, the polarization state of the optical signal will have changed in an unknown manner as the optical signal passes through the optical fiber 145. After passing through the polarization splitter (PS) 150 as described below, the two optical pathways 153*a* and 153*b* may each include a combination of the data introduced by modulators 120*a* and 120*b*. As described above, the unknown polarization state and combination of the data from the optical transmitter 105 pathways 120*a*/120*b* may introduce RF crosstalk and result in signal degradation at the optical receiver 110.

To resolve these issues related to the change in polarization state, the light may be received at the optical receiver 110 by an OC 140 (which may be similar to OC 140), and provided to the PS 150. The PS may split the received optical signal (which is formed of an optical signal with a TE polarization and an optical signal with a TM polarization) into separate optical signals as shown. Specifically, the optical receiver 110 may include an optical pathway 153*a* for an optical signal with a TE polarization state, and an optical pathway 153*b* for an optical signal with a TM polarization state. Similarly to the optical transmitter 105, it will be noted that the various elements depicted in the optical pathway 153*b* (e.g., PR 155 and PTs 160*a*/160*b*) may additionally or alternatively be present in the optical pathway 153*a* in other embodiments.

The optical pathway 153*b* may include a PR 155 which may act similarly to the PR 130. Specifically, the PR 155 may rotate the polarization of the optical signal in the optical 153*b* by 90 degrees such that the optical signal in the two optical pathways 153*b* and 153*a* have a TE polarization.

Because the polarization state of the optical signals was randomly changed (e.g., by the optical fiber 145 as previously described), each of the two optical pathways 153*a* and 153*b* may include a mix of the two data signals that were respectively encoded by modulators 120*a* and 120*b*. To recover the original polarization state of the two optical signals, the optical signals are input into a dynamic polarization controller (DPC) 175. The DPC 175 may be an interferometer with two 2:2 optical splitters 170*a* and 170*b* and two PTs 160*a* and 160*b*. Such an interferometer may be referred to as a Mach-Zehender Interferometer, or an "MZI."

The DPC 175 may be configured to adjust the relative phase and interference between the two optical pathways 153*a* and 153*b*. Specifically, the PT 160*a* may be configured to adjust the differential phase delay between the two optical signals. As used herein, a differential phase delay may refer to the phase delay caused by light of different polarizations arriving at the optical receiver 110 at different times. The PT 160*b* may be configured to adjust the mixing of the two optical signals. As may be seen the PTs 160*a*/160*b* may be controlled at least in part by a logic 165, which will be explained in greater detail below.

Generally, if the two PTs 160*a*/160*b* are tuned correctly (e.g., are controlled to adjust the signal in a desirable way), then the transfer matrix of the DPC 175 may be the inverse of the polarization rotation matrix in the optical fiber 145. Thus, the polarization rotation in the optical fiber 145 may be undone, and the signal error (e.g., as may be measured by a metric such as bit error rate (BER) or some other metric) of the optical signals may be reduced or eliminated.

To arrive at the correct settings for the PTs 160*a* and 160*b* in the DPC 175, the marker tone generated in the optical transmitter 105 may be tracked in the optical receiver 110. Specifically, when the PTs 160*a*/160*b* are correctly set, the optical pathways 153*a* and 153*b* at the output of the DPC 175 should carry optical signals that match the optical signals output from the optical pathways 103*a* and 103*b* to the PC 135.

The optical receiver 110 may include two PDs, 180*a* and 180*b*, that are configured to detect the output of the DPC 175. At least one of the PDs 180*a* and 180*b* may be coupled with a logic 165, which may be implemented as hardware, software, firmware, and or some combination thereof. The logic 165 may be configured to receive a signal from a PD (e.g., PD 180*b*) that is indicative of an amplitude of the optical signal received by the PD 180*b*. Generally, the photodiodes (PDs) used in an optical receiver 110 are square law detectors that are configured to identify the amplitude of an optical signal, but may not be configured to identify the phase of the optical signal. If the marker tone is driven purely in the phase domain, then the marker tone may completely vanish at the output of the optical receiver 110 when the PTs 160*a* and 160*b* are set correctly.

The logic 165 may be configured to analyze the signal received from PD 180*b* and detect an amplitude of the marker tone in the optical signal received by the PD 180*b*. For example, in some embodiments the logic 165 may know the specific frequency of the marker tone, for example because the frequency is pre-configured in some way (e.g., at manufacture of the optical transmitter 105, set by a user, or by some other mechanism). In some embodiments, the logic 165 may be pre-configured with a plurality of values that may be used for the marker tone, and compare each of those values against the output of the PD 180*b*. In some embodiments, the logic 165 may be configured to analyze the output of the PD 180*b* to search for a sinusoidal signal with a frequency on the order of 10s of kHz. In other embodiments, the logic 165 may be configured to identify the marker tone in some other way.

If the logic 165 identifies the marker tone in the optical signal detected by the PD 180*b*, then the logic 165 may provide a control signal to one or both of PTs 160*a* and 160*b*. In some embodiments, the logic 165 may provide the control signal if the amplitude of the marker tone is at or above a pre-identified threshold, which may be expressed as a value, a percentage, a signal-to-noise ratio value, and/or some other type of value. The control signal may change one or more parameters of one or both of the PTs 160*a* and 160*b*. Further discussion of the process for changing the operation of the PTs 160*a*/160*b* is provided below with respect to FIG. 5.

To generalize the function of the DPC 175 in specific and the optical system 100 in general, the marker tone may only be insert into the optical signal in the phase domain by the PT 125. The optical signal in signal pathway 103*b* may be rotated by 90 degrees by PR 130 such that it is orthogonal to the optical signal in pathway 103*a*. The signals may be combined by PC 135, and then output to the optical fiber 145 where some unknown change to the polarization state may occur in between the transmitter 105 and receiver 110.

The optical signal is received at the optical receiver 110, and the two polarized signals are split by PS 150 along optical pathways 153*a* and 153*b*. Due to the polarization rotation in the fiber, the optical signals in optical pathways 153*a* and 153*b* are not the same as the signals output by optical pathways 103*a* and 103*b*.

The two optical signals are output from the PS 150 to the DPC 175, which may be used to undo the polarization rotation by implementing the proper settings on PTs 160*a*/160*b*. If the PTs 160*a*/160*b* of the DPC 175 are set appropriately to fully undo the polarization rotation, the signals output by the DPC 175 into the PDs 180*a* and 180*b* will exactly match the signals at 103*a* and 103*b*. Upon reaching this condition, the optical signal with the marker tone from PT 125 will be completely received by PD 180*b*. As used herein, the term "completely received" may indicate that there is little to no RF crosstalk between the two signal pathways 103*a*/103*b* at the PDs 180*a*/180*b*. In other words, the data applied to the optical signal by modulator 120*b* is identified by PD 180*b* without being detected by PD 180*a*, and the data applied to the optical signal by modulator 120*a* is identified by PD 180*a* without being detected by PD 180*b*.

The amplitude of the marker tone detected by the PD 180*b* will be zero, as the PD 180*b* may only be configured to detect amplitude modulation rather than the phase-modulated marker tone. However, if the PTs 160*a*/160*b* are not set appropriately to fully undo the polarization rotation, then the marker tone may have a detectable amplitude due to the modulation from PT 125 being present on both optical signals output from the DPC 175. The logic 165 may detect this amplitude, and change one or more settings on one or both of PTs 160*a*/160*b*.

Figure 2:
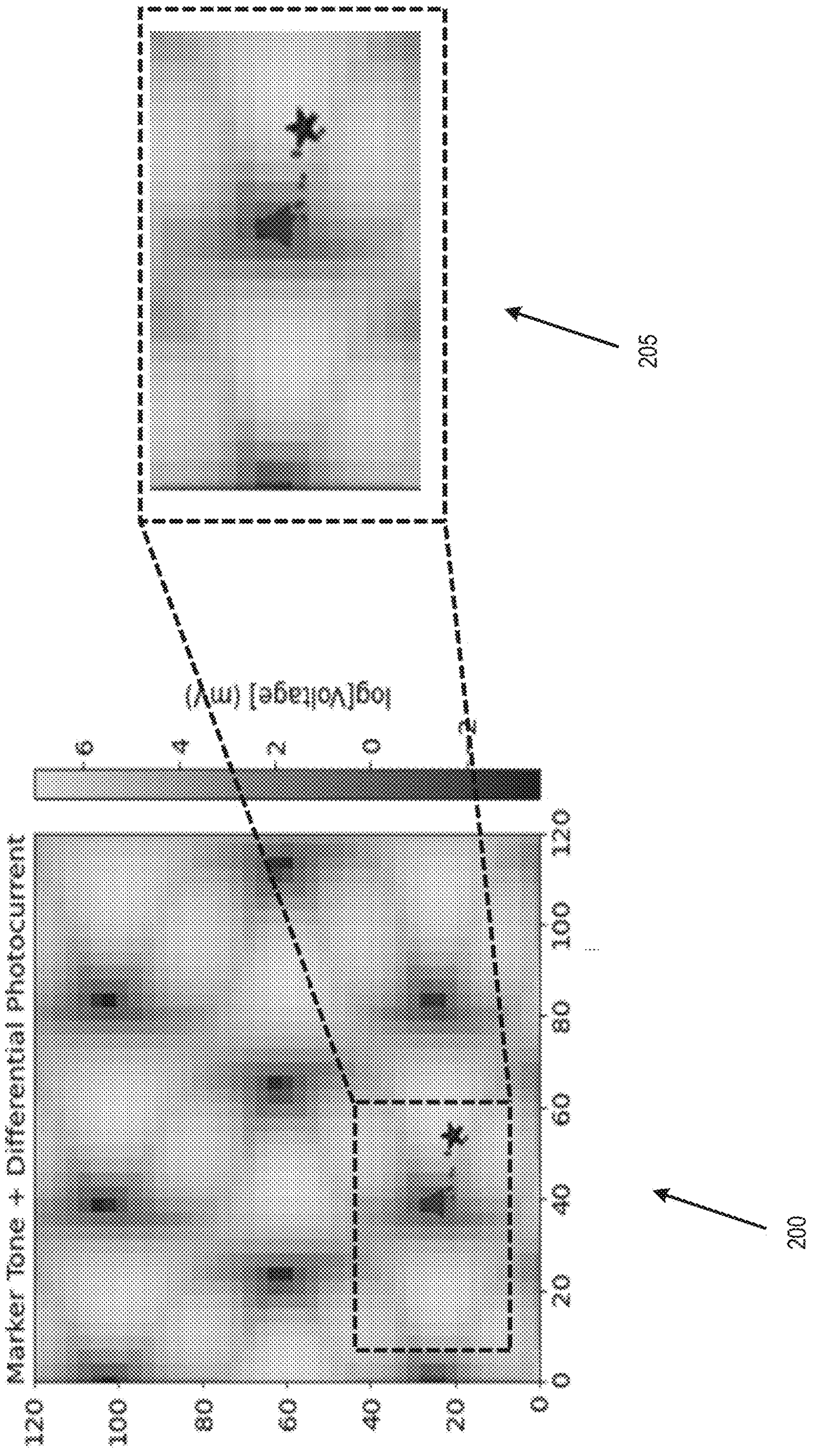
FIG. 2 depicts an example of phase tuner iteration, in accordance with various embodiments.

FIG. 2 depicts an example of iteration of the control parameters of the PTs 160*a*/160*b* based on the feedback provided by PD 180*b* related to the amplitude of the marker tone. Specifically, FIG. 2 depicts a generalized view 200 and a zoomed in view 205. The Y axis of FIG. 2 represents the power of PT 160*a* in milliwatts (mW). The X axis of FIG. 2 represents the power of PT 160*b* in mW. The different shading of the Figure represents the amplitude of the feedback signal provided by PD 180*b*. It will be noted that the shading is presented on a logarithmic scale, and is in millivolts (mV). Generally, as may be seen in FIG. 2, there are a variety of minima where the amplitude of the signal provided by PD 180*b* is at or near a value of 0 (e.g., near the point where the Y axis has a value of 60 and the X axis has a value of 20, near the point where the Y axis has a value of 20 and the X axis has a value of 40, etc.).

The initial settings of the PTs may place an initial detection of the marker tone at the star-shaped indicator shown in 205. Based on the detected amplitude of the marker tone, the logic 165 may iterate the settings of the PTs 160*a*/160*b*. This process may be repeated, as shown by the plurality of dots in 205, each of which represents a different iteration of PT settings and measurement of the amplitude of the marker tone. The process may iterate until the measurement of the marker tone has an amplitude at or near a value of 0 (e.g., the measurement of the marker tone is at or near the minima with a Y value of approximately 20 and an X value of approximately 40).

Figure 3:
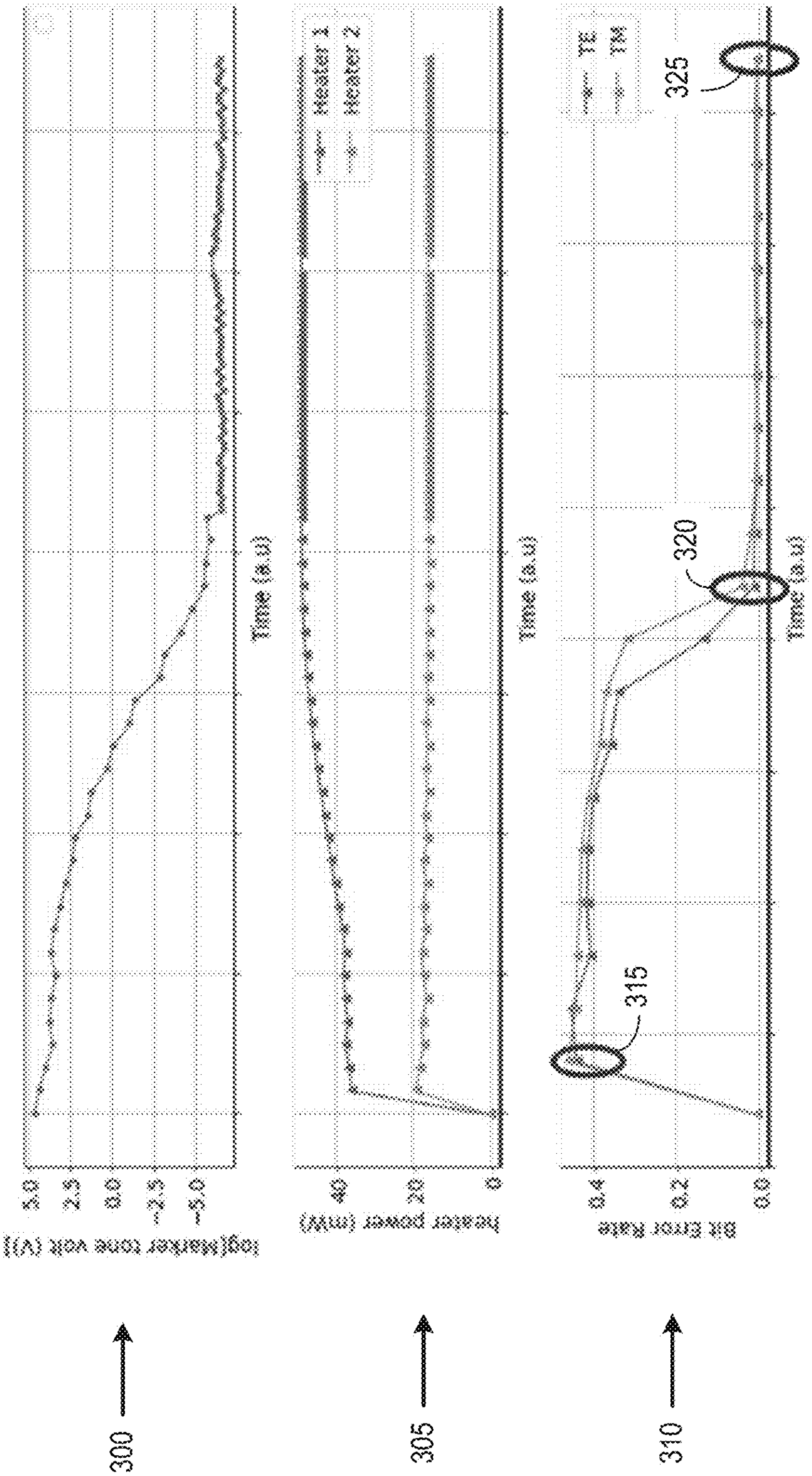
FIG. 3 depicts an example of operation parameters of the optical system in FIG. 1, in accordance with various embodiments.

FIG. 3 depicts an example of operation parameters of the optical system in FIG. 1, in accordance with various embodiments. Specifically, to experimentally validate these minima as the optimal conditions for the DPC and test the link in the event of a polarization perturbation, FIG. 3 depicts the application of two different high-speed (40 gigabaud (GBaud)) pulse amplitude modulation (PAM)-4 data streams on two optical pathways of an optical transmitter (e.g., optical pathways 103*a* and 103*b*), and measure the resulting BER at the two PDs of the optical receiver (e.g., PDs 180*a* and 180*b*) using a real-time oscilloscope. The results are depicted in FIG. 3. A sudden polarization change is applied using a polarization scrambler between the optical transmitter and the optical receiver, and then the PTs of the DPC are tuned using a gradient descent algorithm that minimizes the marker tone strength. The BER is monitored throughout the convergence process, starting from the perturbation at 315, approaching the optimal settings for the PTs of the DPC at 320, and after fine tuning to arrive precisely at the optimal settings for the PT at 325. The various values are depicted at 300, which shows a measurement related to the amplitude of the marker tone as detected by a PD such as PD 180*b*; 305, which shows the power settings of the PTs of the DPC; and 310, which shows the measured BER for the two optical signals. It can be seen in FIG. 3 that the measured BER clearly follows the measured marker tone voltage, as the PTs are tuned to converge to the optimal conditions.

Figure 4:
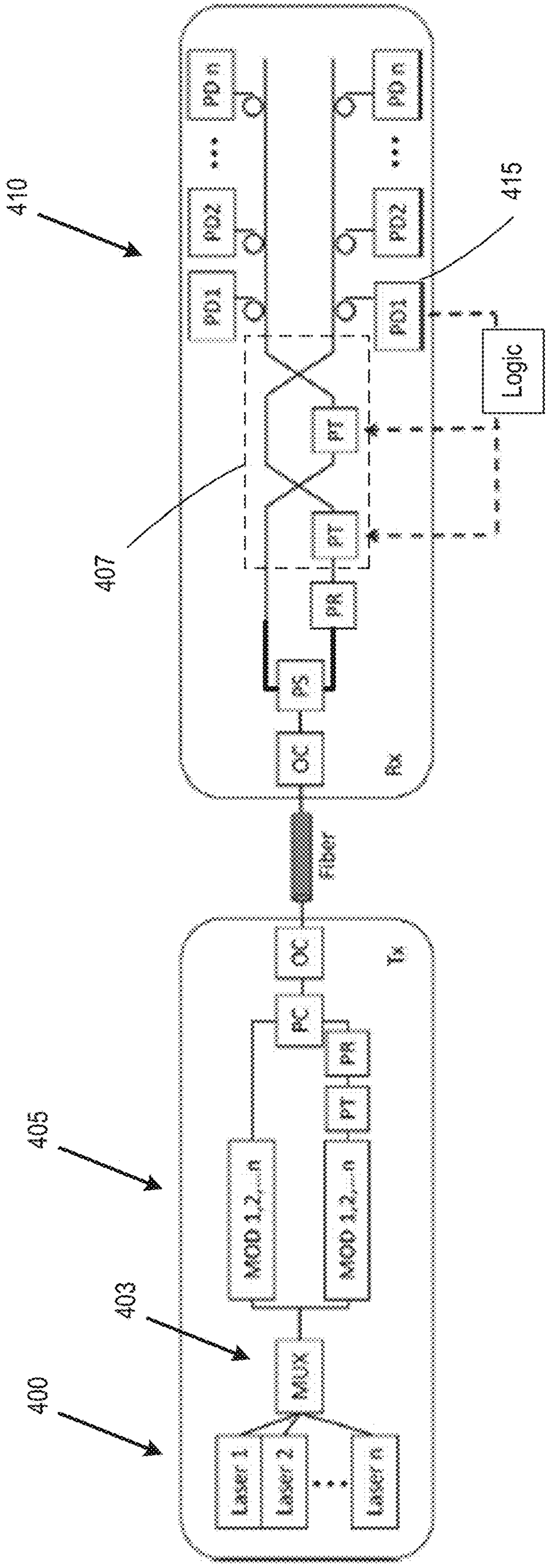
FIG. 4 depicts an alternative example system-level diagram of an optical system, in accordance with various embodiments.

FIG. 4 depicts an example of expansion of concepts herein to accommodate multiple transmitter wavelengths without increasing the complexity or number of DPC elements. It will be understood that several of the elements of the embodiment of FIG. 4 are similar to the elements depicted, enumerated, and described in FIG. 1. As such, discussion of those elements will not be repeated herein for the sake of lack of redundancy.

In this embodiment, multiple single-wavelength lasers are used to generate multiple wavelengths at 400, and subsequently combined at a multiplexer (MUX) at 403. It will be understood that, in some embodiments, the multiple laser depicted at 400 may be or may include a single multi-wavelength laser, such as a mode-locked laser. Additionally, the transmitter may include a plurality of modulators at 405, wherein respective modulators of the plurality of modulators correspond to respective wavelengths of the plurality of wavelengths output by the laser(s) at 400. At the receiver, a single DPC 407 that is operated based on feedback from a single PD 415 is used to recover the original polarizations before each wavelength is demultiplexed and received at the various PDs at 410.

It will be understood that broadband behavior of the DPC 175 may be desirable to enable the multi-wavelength configuration of FIG. 4. To make a broadband DPC, the components in the DPC such as waveguides, splitters, PRs, OCs, etc. may be optically path matched or have near-zero differential group delay between the two polarizations of the optical signal.

To put it another way, it may be desirable for the two polarizations of light need to propagate at roughly the same group velocity in and between the optical transmitter and the optical receiver. Because typical silicon waveguides (such as those that may be used in the various optical pathways or elements of the optical transmitter, optical receiver, and/or optical fiber) are highly birefringent in nature, it may be difficult to achieve such a matched velocity.

To resolve this issue, some embodiments may rely on characterizing the differential group delay between the polarizations, and then compensating for the difference between the two polarizations by introducing a delay for the faster polarization. If such compensation is not performed, then the optimal settings for the PTs 160*a* and 160*b* may vary for each wavelength of light. Such compensation may be achieved by identifying which of the two optical pathways 153*a* or 153*b* is providing a faster polarization pathway, and adding a compensatory piece of waveguide into the path to lengthen the optical pathway.

Figure 5:
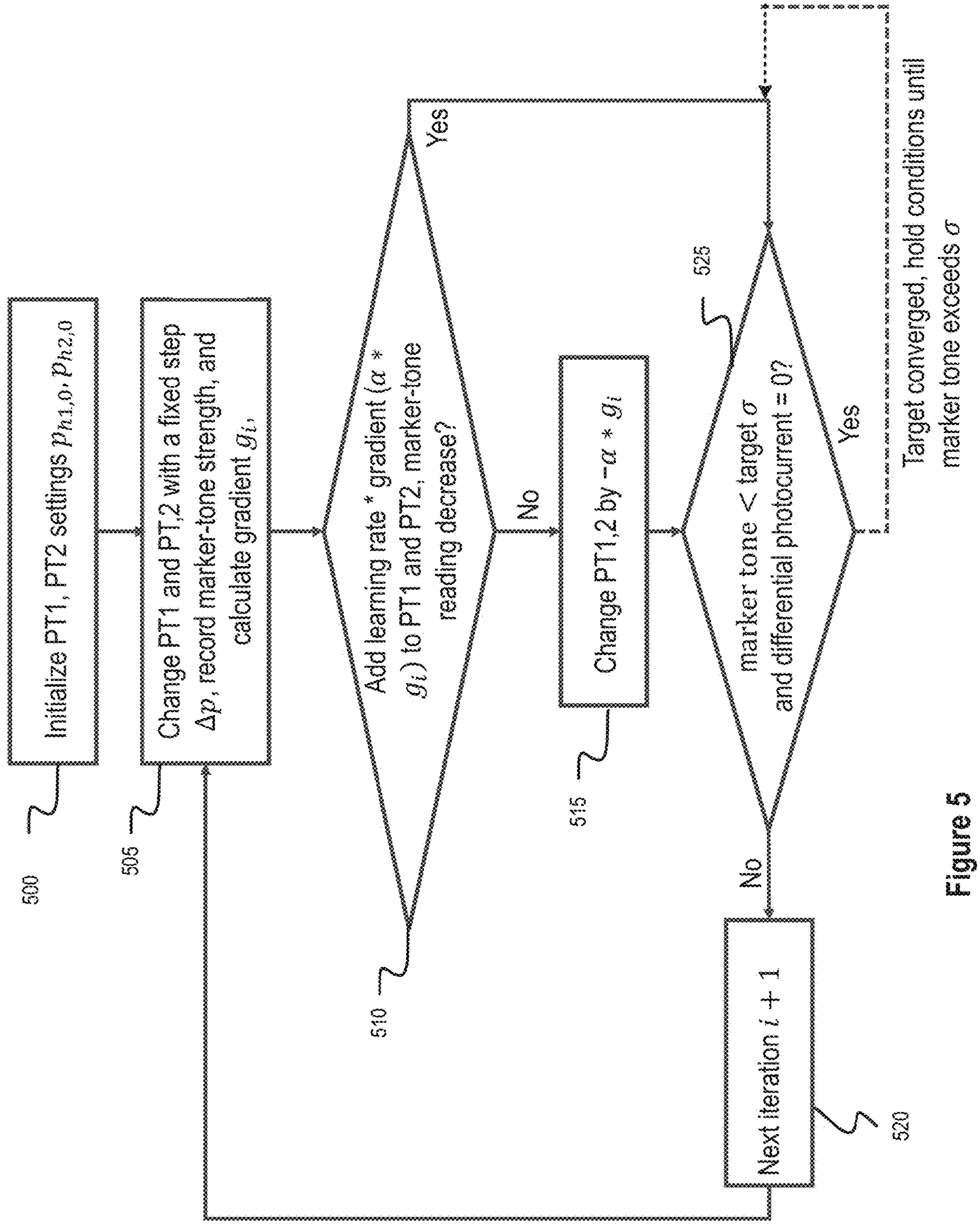
FIG. 5 depicts an example process that may be performed by a logic coupled with the optical system of FIG. 1, in accordance with various embodiments.

FIG. 5 depicts an example process that may be performed by a logic coupled with the optical system of FIG. 1, e.g., logic 165, in accordance with various embodiments. The process of FIG. 5 may be related to the iterative processes described above, and as depicted in FIG. 2 wherein the settings of the PTs of the DPC (e.g., PTs 160*a* and 160*b*) are iteratively adjusted until the amplitude of the marker signal, as measured by a PD such as PD 180*b*, is at or near 0.

The process may include initializing, at 500, the settings of the two PTs of the DPC (demarcated in FIG. 5 as PT1 and PT2 for the sake of case of discussion). The initial settings may be referred to as $p_{h1,0}$ and $p_{h2,0}$ for PT 160*a* and 160*b*, respectively. These settings may be, for example, a voltage value for the PTs 160*a*/160*b*. For example, an initial setting may be to set an input voltage to the PTs 160*a*/160*b* to 1 volt (V). However, it will be understood that, in other embodiments, a different initial voltage may be provided.

The settings $p_{h1,0}$ and $p_{h2,0}$ may then be adjusted with a fixed step Δp at 505. For example, Δp may be equal to approximately 0.2 volt, however it will be understood that, in other embodiments, a higher or lower step size may be used based on factors such as the specific materials used, the thermal coefficient(s) of the different waveguides, etc. After the settings of PT1 and PT2 are adjusted, the amplitude of the marker tone, as measured by PD 180*b*, is measured. A gradient g; may then be calculated. For example, the gradient g; may be calculated based on a derivate of the amplitude of the marker tone between iterations of the technique of FIG. 5.

At 510, a learning rate a may be applied to the gradient g; (for example through multiplication of the learning rate to the gradient, or some other function such as addition, the use of one or more constants and/or additional variables, etc.). The resultant value may then be applied to the settings for PT1 and PT2, and the amplitude of the marker tone at PD 180*b* may again be calculated. Such application may take the generalized form of $p_{h1,i}=p_{h1,(i-1)}+(\alpha*g_i)$. The logic may then identify whether the marker tone reading (e.g., the amplitude of the marker tone as measured by the PD 180*b*) decreased. In embodiments herein, the value of a may be a scalar value such as a value between approximately 0.002 and approximately 0.007. For example, in some embodiments, the value of a may be approximately 0.005.

If the marker tone reading did not decrease, then the logic may change the settings for PT1 and PT2 by the negative of the function applied at 510. For example, if the function is $\alpha*g_i$ (as shown in FIG. 5), then the settings for PT1 and PT2 may be changed by $-\alpha*g_i$. In some embodiments, the values for PT1 and PT2 may be reverted back to the values they had prior to the application of $\alpha*g_i$ at 510, and then changed by the amount $-\alpha*g_i$. The process may then proceed to 525. If the marker tone reading was identified to have decreased at 510, then the process may skip element 515 and proceed directly to 525. In this manner, after performance of elements 510 and 515, the settings for PT1 and PT2 may have changed by plus or minus $(\alpha*g_i)$.

The amplitude of the marker tone may then be measured again at 525. In some embodiments, the marker tone may be compared against a threshold value that is referred to in FIG. 5 as σ. The value of σ may be, for example, pre-identified (e.g., programmed into the logic at the time of manufacture of the logic and/or optical system), identified by the logic (e.g., based on the specific elements used for or used in the optical system), dynamically identified (e.g., based on the initial value of the marker tone amplitude), etc. In some embodiments, the value σ may be, for example less than or equal to approximately 0.1V. In other embodiments, σ may be larger or smaller based on factors such as the length of the optical fiber, the required data rate, the required BER limits, etc.

If the amplitude of the marker tone as measured by the PD 180*b* is identified to be less than (or, in other embodiments, less than or equal to) σ, then the process may either continue to element 520, or return to element 505 as shown. In some embodiments, an additional check may be performed to identify whether the differential photocurrent between PDs 180*a* and 180*b* is equal to, or approximately equal to, 0 to ensure that both PDs 180*a* and 180*b* are providing similar signal performance.

If the result of the check at element 525 is yes (e.g., the marker tone is less than the value σ and/or the differential photocurrent is equal to or approximately equal to 0), then this may indicate that the settings of the PTs are such that the BER is minimized to an acceptable value. As such, the values of the PTs may be maintained until such time as the amplitude of the marker tone exceeds the value σ (e.g., due to thermal drift or some other factor). To put it another way, the process may iterate at element 525 until the value of the marker tone amplitude meets or exceeds σ.

However, if the result of the check at element 525 is no, then the process may iterate at 520 and return to element 505 as shown in FIG. 5.

Figure 6:
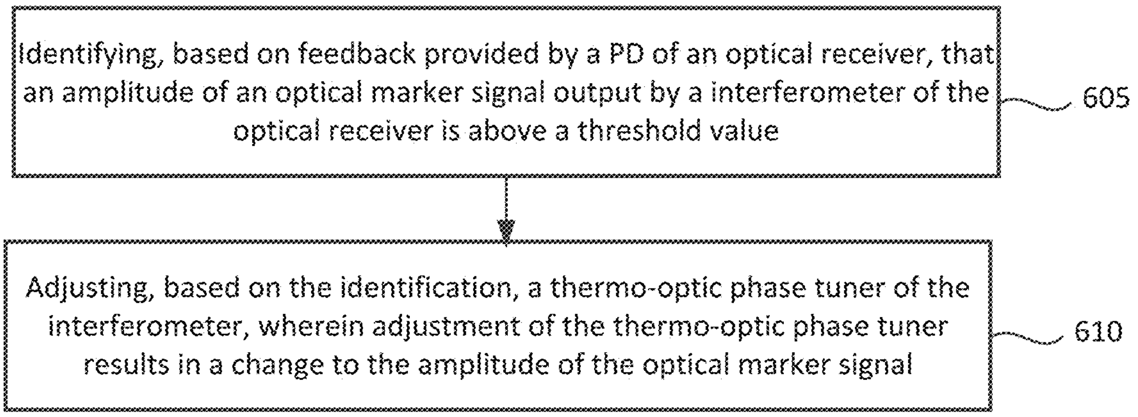
FIG. 6 depicts an alternative example process that may be performed by a logic coupled with the optical system of FIG. 1, in accordance with various embodiments.

FIG. 6 depicts an alternative example process that may be performed by a logic such as logic 165. The process may include identifying, at 605 based on feedback provided by a PD (e.g., PD 180*b*) of an optical receiver (e.g., optical receiver 110), that an amplitude of an optical marker signal output by an interferometer (e.g., DPC 175) of the optical receiver is above a threshold value (e.g., the value σ as described above).

The process may further include adjusting, at 610 based on the identification, a thermo-optic PT (e.g., one or both of PTs 160*a* and 160*b* of the DPC 175) of the interferometer, wherein adjustment of the thermo-optic PT results in a change to the amplitude of the optical marker signal.

It will be understood that the above depicted processes of FIGS. 5 and 6 are intended as example processes in accordance with particular embodiments. Other embodiments may include more or fewer elements than are depicted herein. For example, other embodiments may use different values or variables than depicted, or the elements may be performed in a sequence other than what is depicted in FIG. 5 or 6. Other variations may be present in other embodiments.

Figure 7:
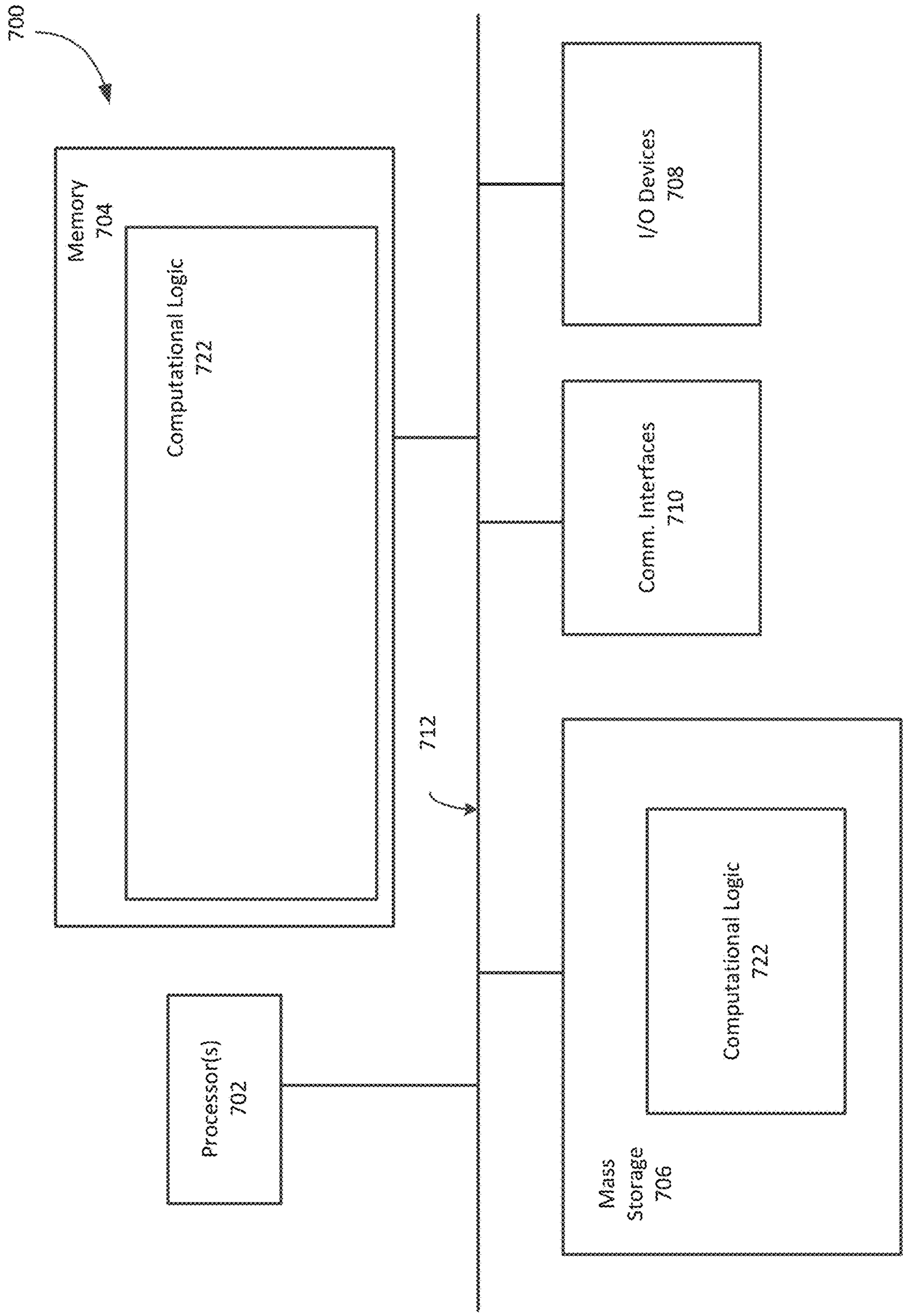
FIG. 7 illustrates an example computing system suitable for practicing various aspects of the disclosure, in accordance with various embodiments.

FIG. 7 illustrates an example computing device 700 suitable for use to practice aspects of the present disclosure, in accordance with various embodiments. For example, the example computing device 700 may be suitable to implement the functionalities, methods, techniques, or processes, in whole or in part, associated with one or more of FIGS. 1-6, and/or some other technique or process described herein.

As shown, computing device 700 may include one or more processors 702, each having one or more processor cores, and system memory 704. The processor 702 may include any type of unicore or multi-core processors. Each processor core may include a central processing unit (CPU), and one or more level of caches. The processor 702 may be implemented as an integrated circuit. The computing device 700 may include mass storage devices 706 (such as diskette, hard drive, volatile memory (e.g., dynamic random access memory (DRAM)), compact disc read only memory (CD-ROM), digital versatile disk (DVD) and so forth). In general, system memory 704 and/or mass storage devices 706 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 700 may further include input/output (I/O) devices 708 such as a display, keyboard, cursor control, remote control, gaming controller, image capture device, one or more three-dimensional cameras used to capture images, and so forth, and communication interfaces 710 (such as network interface cards, modems, infrared receivers, radio receivers (e.g., Bluetooth), and so forth). I/O devices 708 may be suitable for communicative connections with three-dimensional cameras or user devices. In some embodiments, I/O devices 708 when used as user devices may include a device necessary for implementing the functionalities of receiving an image captured by a camera.

The communication interfaces 710 may include communication chips (not shown) that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, system memory 704 and mass storage devices 706 may be employed to store a working copy and a permanent copy of the programming instructions implementing the operations, functionalities, techniques, methods, or processes, in whole or in part, associated with FIGS. 1-6, and/or some other technique or process described herein, generally shown as computational logic 722. Computational logic 722 may be implemented by assembler instructions supported by processor(s) 702 or high-level languages that may be compiled into such instructions.

The permanent copy of the programming instructions may be placed into mass storage devices 706 in the factory, or in the field, though, for example, a distribution medium (not shown), such as a compact disc (CD), or through communication interfaces 710 (from a distribution server (not shown)).

In some embodiments, the optical system may be used for communication within a single element (e.g., communication between two processors 702, communication between two cores of a single process, etc.). In some embodiments, the optical system may be used for communication between two elements (e.g., between a processor 702 and an I/O device 708). In some embodiments, the logic 165 may be at least partially implemented as, implemented in, or include an element such as processor 702 and/or computational logic 722.

Figure 8:
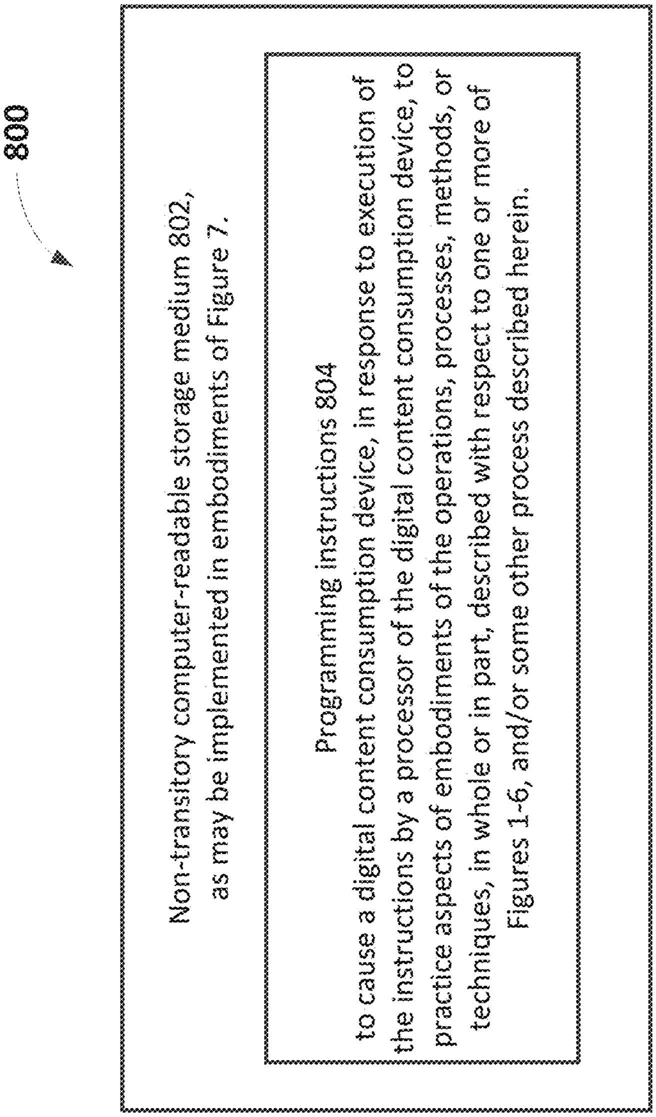
FIG. 8 illustrates an example non-transitory computer-readable storage medium having instructions configured to practice all or selected ones of the operations associated with the processes described herein.

FIG. 8 illustrates an example non-transitory computer-readable storage media 802 having instructions configured to practice all or selected ones of the operations associated with the processes described above. As illustrated, non-transitory computer-readable storage medium 802 may include a number of programming instructions 804. Programming instructions 804 may be configured to enable a device, e.g., computing device 700, in response to execution of the programming instructions, to perform one or more operations, processes, methods, or techniques, in whole or in part, described in reference to FIGS. 1-6, and/or some other technique or process described herein. In alternate embodiments, programming instructions 804 may be disposed on multiple non-transitory computer-readable storage media 802 instead. In still other embodiments, programming instructions 804 may be encoded in transitory computer-readable signals.

In the preceding description, various aspects of the illustrative implementations were described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations were set forth in order to provide a thorough understanding of the illustrative implementations. It will be apparent to one skilled in the art that embodiments of the present disclosure may be practiced without the specific details. In other instances, well-known features have been omitted or simplified in order not to obscure the illustrative implementations.

In the preceding detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the detailed description is not to be taken in a limiting sense.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). More generally, various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The description may have used perspective-based descriptions such as top/bottom, in/out, over/under, and the like. Such descriptions were used to facilitate the discussion and were not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Various values are provided herein, for example with respect to frequencies, voltages, distances, etc. It will be understood that the values provided are for the sake of example and discussion only, and other values may be used in other embodiments. For example, real-world implementations may have values that are approximations of the provided values, and such approximations may be within +/−10% of the provided values to account for real-world variances or defects.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

Example 1 may include an optical transmitter comprising: a first signal pathway configured to generate a first modulated optical signal with a first polarization; a second signal pathway configured to generate a second modulated optical signal with a second polarization; and a phase tuner configured to insert a marker signal into the second modulated optical signal prior to polarization of the second modulated optical signal.

Example 2 may include the optical transmitter of example 1, and/or some other example herein, wherein the first modulated optical signal includes a single input optical signal modulated with a single data signal.

Example 3 may include the optical transmitter of example 1, and/or some other example herein, wherein the first modulated optical signal includes a plurality of input optical signals, wherein respective input optical signals of the plurality of input optical signals are modulated by respective data signals of a plurality of data signals.

Example 4 may include the optical transmitter of any of examples 1-3, and/or some other example herein, wherein the marker signal has a lower frequency than a data rate of the first or second modulated optical signals.

Example 5 may include the optical transmitter of example 4, and/or some other example herein, wherein: the marker signal has a frequency between approximately 5 kilohertz (kHz) and approximately 15 kHz; and the first or second modulated signals have a data rate between approximately 10 gigabits per second (gb/s) and approximately 99 gb/s.

Example 6 may include the optical transmitter of any of examples 1-5, and/or some other example herein, further comprising: a polarization combiner to combine an output of the first signal pathway and the second signal pathway to form an output optical signal; and an optical coupler to output the output optical signal from the optical transmitter.

Example 7 may include an optical receiver comprising: an optical coupler to receive an optical signal from an optical transmitter, wherein the optical signal includes a first modulated optical signal with a first polarization and a second modulated optical signal with a second polarization, wherein the first modulated optical signal includes an input optical signal modulated with first data, and the second modulated optical signal includes a marker signal and the input optical signal modulated with second data; a photodiode (PD) configured to provide feedback related to an amplitude of the marker signal detected by the PD; and a dynamic polarization controller (DPC) that includes a first phase tuner and a second phase tuner, wherein the first phase tuner or the second phase tuner are configured to adjust a phase of at least a portion of the optical signal based on the feedback provided by the PD.

Example 8 includes the optical receiver of example 7, and/or some other example herein, wherein the first and second phase tuners are thermo-optic phase tuners.

Example 9 includes the optical receiver of any of examples 7-8, and/or some other example herein, wherein the DPC is an interferometer.

Example 10 includes the optical receiver of example 9, and/or some other example herein, wherein the DPC is a Mach-Zehender interferometer.

Example 11 includes the optical receiver of any of examples 7-10, and/or some other example herein, wherein: the PD is configured to provide the feedback to a control logic; and the control logic is to control operation of the first or second phase tuner based on the feedback.

Example 12 includes the optical receiver of example 11, and/or some other example herein, wherein the control logic is to modify operation of the first or second phase tuner based on an identification that the amplitude of the marker signal is above a threshold value.

Example 13 includes the optical receiver of any of examples 7-12, and/or some other example herein, wherein the first modulated optical signal includes a single input optical signal modulated with a single data signal.

Example 14 includes the optical receiver of any of examples 7-12, and/or some other example herein, wherein the first modulated optical signal includes a plurality of input optical signals, wherein respective input optical signals of the plurality of input optical signals are modulated by respective data signals of a plurality of data signals.

Example 15 includes one or more non-transitory computer-readable media (NTCRM) comprising instructions that, upon execution of the instructions by a control logic that is communicatively coupled with an optical receiver, cause the control logic to: identify, based on feedback provided by a photodiode (PD) of an optical receiver, that an amplitude of an optical marker signal output by an interferometer of the optical receiver is above a threshold value; and adjust, based on the identification, a thermo-optic phase tuner of the interferometer, wherein adjustment of the thermo-optic phase tuner results in a change to the amplitude of the optical marker signal.

Example 16 includes the one or more NTCRM of example 15, and/or some other example herein, wherein the optical marker signal is an element of an optical signal received by the optical receiver from an optical transmitter.

Example 17 includes the one or more NTCRM of example 16, and/or some other example herein, wherein the optical signal includes: a first polarized optical signal that includes the optical marker signal and an input optical signal modulated with first data; and a second polarized optical signal that includes the input optical signal modulated with second data.

Example 18 includes the one or more NTCRM of example 17, and/or some other example herein, wherein the DPC is an interferometer configured to receive the first polarized optical signal and the second polarized optical signal.

Example 19 includes the one or more NTCRM of any of examples 17-18, and/or some other example herein, wherein the marker signal has a lower frequency than a data rate of the first or second modulated optical signals.

Example 20 includes the one or more NTCRM of any of examples 17-19, and/or some other example herein, wherein the first polarized optical signal further includes a second input signal modulated with third data.

Example 21 includes an apparatus, comprising: a laser; an optical splitter coupled to the laser; a first optical pathway coupled to the optical splitter, the first optical pathway comprising a first modulator, the first optical pathway coupled to an optical combiner; a second optical pathway coupled to the optical splitter, the second optical pathway comprising a second modulator coupled to the optical splitter, a phase tuner coupled to the second modulator, and a polarization rotator coupled to the phase tuner and to the optical combiner; and an optical coupler coupled to the optical combiner.

Example 22 includes the apparatus of example 21, and/or some other example herein, wherein the optical combiner comprises a polarization combiner.

Example 23 includes the apparatus of any of examples 21-22, and/or some other example herein, wherein the phase tuner comprises a ring modulator.

Example 24 includes the apparatus of any of examples 21-23, and/or some other example herein, wherein the phase tuner comprises a thermo-optic phase tuner.

Example 25 includes the apparatus of any of examples 21-24, and/or some other example herein, wherein the first modulator comprises a plurality of first modulators, and wherein the second modulator comprises a plurality of second modulators.

Example 26 includes the apparatus of any of examples 21-25, and/or some other example herein, wherein the first optical pathway comprises a transverse electric pathway, and wherein the second optical pathway comprises a transverse magnetic pathway.

Example 27 includes the apparatus of any of examples 21-26, and/or some other example herein, wherein the laser, the optical splitter, the first optical pathway, the second optical pathway, and the optical combiner comprise an integrated circuit.

Example 28 includes the apparatus of any of examples 21-27, and/or some other example herein, wherein the laser comprises a plurality of lasers.

Example 29 includes an apparatus, comprising: an optical coupler; a phase splitter coupled to the optical coupler; a first optical pathway coupled to the phase splitter and coupled to an interferometer; a second optical pathway coupled to the phase splitter and to the interferometer; a first photodiode coupled to the interferometer; and a second photodiode coupled to the interferometer.

Example 30 includes the apparatus of example 29, and/or some other example herein, wherein the interferometer comprises: a first optical splitter; a second optical splitter; a first phase tuner coupled to the first optical splitter; and a second phase tuner coupled to the first optical splitter and coupled to the second optical splitter.

Example 31 includes the apparatus of example 30, and/or some other example herein, wherein the first optical splitter and the second optical splitter comprises 2:2 optical splitters.

Example 32 includes the apparatus of any of examples 29-31, and/or some other example herein, wherein the interferometer comprises a Mach-Zehender interferometer.

Example 33 includes the apparatus of any of examples 29-32, and/or some other example herein, wherein the first phase tuner and the second phase tuners comprise ring modulators.

Example 34 includes the apparatus of any of examples 29-33, and/or some other example herein, wherein the optical splitter, the first optical pathway, the second optical pathway, the interferometer, the first photodiode, and the second photodiode comprise an integrated circuit.

Example Z01 may include an apparatus comprising means to perform one or more elements of a method described in or related to any of the examples herein, and/or any other method, process, or technique process described herein, or portions or parts thereof.

Example Z02 may include an apparatus comprising logic, modules, or circuitry to perform one or more elements of a method described in or related to any of the examples herein, and/or any other method, process, or technique described herein, or portions or parts thereof.

Example Z03 may include a method, technique, or process as described in or related to any of the examples herein, and/or any other method, process, or technique described herein, or portions or parts thereof.

Example Z04 may include a signal as described in or related to any of the examples herein, and/or any other method, process, or technique described herein, or portions or parts thereof.

Example Z05 may include an apparatus comprising one or more processors and non-transitory computer-readable media that include instructions which, when executed by the one or more processors, are to cause the apparatus to perform one or more elements of a method described in or related to any of the examples herein, and/or any other method, process, or technique described herein, or portions or parts thereof.

Example Z06 may include one or more non-transitory computer readable media comprising instructions that, upon execution of the instructions by one or more processors of an electronic device, are to cause the electronic device to perform one or more elements of a method described in or related to any of the examples herein, and/or any other method, process, or technique described herein, or portions or parts thereof.

Example Z07 may include a computer program related to one or more elements of a method described in or related to any of the examples herein, and/or any other method, process, or technique described herein, or portions or parts thereof.

The invention claimed is:

1. An optical transmitter comprising:

a first signal pathway configured to generate a first modulated optical signal with a first polarization;

a second signal pathway configured to generate a second modulated optical signal with a second polarization; and a phase tuner configured to insert a marker signal in a phase domain into the second modulated optical signal prior to polarization rotation of the second modulated optical signal, wherein the marker signal is configured to enable polarization tracking at an optical receiver based on detection of an amplitude of the marker signal.

2. The optical transmitter of claim 1, wherein the first modulated optical signal includes a single input optical signal modulated with a single data signal.

3. The optical transmitter of claim 1, wherein the first modulated optical signal includes a plurality of input optical signals, wherein respective input optical signals of the plurality of input optical signals are modulated by respective data signals of a plurality of data signals.

4. The optical transmitter of claim 1, wherein the marker signal has a lower frequency than a data rate of the first or second modulated optical signals.

5. The optical transmitter of claim 1, wherein:

the marker signal has a frequency between approximately 10 kilohertz (kHz) and 1 megahertz (MHz); and the first or second modulated signals have a data rate between approximately 10 gigabits per second (gb/s) and approximately 300 gb/s.

6. The optical transmitter of claim 1, further comprising:

a polarization combiner to combine an output of the first signal pathway and the second signal pathway to form an output optical signal; and an optical coupler to output the output optical signal from the optical transmitter.

7. An apparatus, comprising:

a laser;

an optical splitter coupled to the laser;

a first optical pathway coupled to the optical splitter, the first optical pathway comprising a first modulator, the first optical pathway coupled to an optical combiner;

a second optical pathway coupled to the optical splitter, the second optical pathway comprising a second modulator coupled to the optical splitter, a phase tuner coupled to the second modulator and configured to insert a marker signal in a phase domain into an optical signal of the second optical pathway, wherein the marker signal is configured to enable polarization tracking at an optical receiver based on detection of an amplitude of the marker signal, and a polarization rotator coupled to the phase tuner and to the optical combiner; and an optical coupler coupled to the optical combiner.

8. The apparatus of claim 7, wherein the optical combiner comprises a polarization combiner.

9. The apparatus of claim 7, wherein the phase tuner comprises a ring modulator.

10. The apparatus of claim 7, wherein the phase tuner comprises a thermo-optic phase tuner.

11. The apparatus of claim 7, wherein the first modulator comprises a plurality of first modulators, and wherein the second modulator comprises a plurality of second modulators.

12. The apparatus of claim 7, wherein the first optical pathway comprises a transverse electric pathway, and wherein the second optical pathway comprises a transverse magnetic pathway.

13. The apparatus of claim 7, wherein the laser, the optical splitter, the first optical pathway, the second optical pathway, and the optical combiner comprise an integrated circuit.

14. The apparatus of claim 7, wherein the laser comprises a plurality of lasers.

* * * * *